United States Patent Office 2,925,324
Patented Feb. 16, 1960

2,925,324
PROCESS FOR THE MANUFACTURE OF CRYOLITE

Jonas Kamlet, New York, N.Y., assignor to Reynolds Metals Company, Richmond, Va., a corporation of Delaware No Drawing. Application February 6, 1958
Serial No. 713,563

10 Claims. (Cl. 23—88)

This invention relates to a process for the manufacture of cryolite. More particularly, this invention relates to an efficient and economical process for the manufacture of silica-free cryolite (suitable for use in the electrolytic manufacture of aluminum) employing as the primary raw material a by-product from the processing bauxite of ores which has no present industrial utility.

Many bauxite and bauxitic ores found throughout the world (such as the extensive deposits mined an Arkansas) contain small amounts of fluoride (probably bound as calcium fluoride) and sulfide (probably bound as iron pyrites). These elements find their way into the "red mud" (the desilication residue) of the well-known Bayer process for the recovery of alumina from bauxite. It is now common practice in many plants to recover alumina and soda values from this "red mud" residue by sintering the same with limestone and soda ash (the so-called "combination process" or "soda-lime sinter process") and leaching sodium aluminate from the sinter. During the calcination of the "red mud" in this process, the pyrites are probably oxidized to iron sulfates. The sulfate ion in the latter and the fluoride in the $CaF_2$ are solubilized by the soda in the kiln feed, and are dissolved out of the sinter with the sodium aluminate leach liquors. After alumina recovery from these leach liquors, the spent liquors are concentrated for recycling to the process. During the concentration, the sulfate and fluoride precipitates out as a double salt of composition $Na_2SO_4 \cdot NaF$, which is filtered off and recovered. About 13.5 to 14.0 lbs. of this double salt are recovered per ton of Arkansas bauxite ore processed.

At present, this double salt by-product has no industrial use and is largely being discarded. It is the purpose of this invention to provide a process for the manufacture of silica-free cryolite whereby all of the alkali value of this double salt—$Na_2SO_4 \cdot NaF$—and all of the fluoride value are recovered as cryolite and all of the sulfate value is utilized to replace and economize the cost of an equivalent amount of sulfuric acid in the supplying of the deficit of fluoride required to form $Na_3AlF_6$.

This invention may best be understood by a seriatim discussion of the steps thereof.

STEP 1

The first step of this process involves the reaction of the double salt ($Na_2SO_4 \cdot NaF$) with an aqueous solution of fluoboric acid in the presence of a quantity of aluminum oxide or aluminum hydroxide, according to the equations:

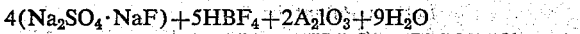
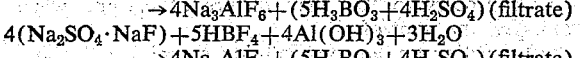

The solution of fluoboric acid, which is derived in the second step of this process, may contain considerable amounts of free boric acid. It may range in $HBF_4$ concentration from as low as 1% to as high as 75%. The reaction with the double salt and the alumina or aluminum hydroxide may be effected at any temperature from room temperature to 130° C. (at which temperature $HBF_4$ boils with decomposition). The reaction may be effected at subatmospheric, atmospheric or superatmospheric pressure.

As a source of the aluminum in the cryolite alumina (aluminum oxide) derived from any source whatever may be used (such as the calcined alumina from the Bayer process or the combined process. However, because of its greater reactivity I prefer to use aluminum hydroxide and preferably the washed, wet filter cake of aluminum hydroxide obtained in the Bayer process, prior to calcination to alumina.

For optimum reagent economy and yields, the double salt, aluminum oxide or hydroxide, and fluoboric acid solution should be used in stoichiometric proportions, i.e. four moles of double salt, five moles of fluoboric acid, and four mole-equivalents of aluminum oxide or aluminum hydroxide. The cryolite formed is filtered off, washed with cold water and the combined filtrate and washings (containing boric acid and sulfuric acid) is used in the second step of the process to obtain the fluoboric acid required in the first step of the process.

I prefer to effect the reaction by digesting the double salt, the aluminum oxide or hydroxide, and the fluoboric acid at 90° C. to 100° C. for one to two hours, with good agitation, and thereafter filtering off the $Na_3AlF_6$ precipitate from the solution of boric acid and sulfuric acid. The cryolite is washed with a little water and dried. These conditions are by no means critical and may be varied over wide ranges. Excellent yields of cryolite are obtained by this procedure.

STEP II

In the second step of this process, the filtrate and washings of boric acid and sulfuric acid obtained in the first step are digested with a calcium-fluoride-containing material and sufficient additional sulfuric acid, to regenerate the aqueous solution containing 5 moles of $HBF_4$ required in the first step of this process, according to the equation:

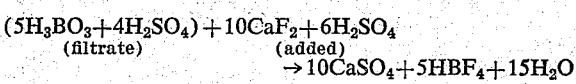

The formation of fluoboric acid by the reaction of calcium fluoride in the presence of sulfuric acid and boric acid is well known (Heiser, Chemical Engineering Progress 45, #3, 169–179 (1949); U.S. Patents 2,182,509–511 (1939). This may be effected by the digestion of a calcium fluoride-containing material with sulfuric acid and boric acid in aqueous solution between room temperature and 100° C., at subatmospheric, atmospheric or superatmospheric pressures.

The calcium fluoride-containing material is preferably fluospar (also known as fluorite, fluor and (in Great Britain) as Derbyshire spar. Although acid-grade fluorspar (containing a minimum of 95% $CaF_2$) is preferred for use in this process, much poorer grades of fluorspar may be used, since it is an inherent advantage of this process that the silica content of the fluorspar does not interfere with the formation of $HBF_4$, but remains behind as an insoluble precipitate which is filtered off. Thus, it is feasible to use fluorspars containing as little as 60% $CaF_2$. It is desirable to use fluorspars containing as little $CaCO_3$ as possible since this component only consumes sulfuric acid without corresponding $HBF_4$ formation. However, a high-silica fluorspar may be used almost entirely without reference to its silica content if its $CaCO_3$ is low. This permits the free use of low grade fluorspars in the process of this invention, which is not feasible with many present-day cryolite processes.

The fluoboric acid formation is effected by digesting the fluorspar in an aqueous medium with sulfuric acid and boric acid. For optimum yields the sulfuric acid is used in amounts corresponding to that theoretically required for the reaction of the $CaCO_3$ in the fluorspar and the conversion of the $CaF_2$ to $HBF_4$. The fluorspar is used in amounts equivalent to 100% to 110% of the theoretical. It has been found that the best yields of fluoboric acid and the lowest silica retention in the $HBF_4$ solution have been obtained by employing boric acid in amounts equivalent to 120% to 150% of the amount theoretically required for $HBF_4$ formation. Since this excess of boric acid simply recycles in the process, without loss, the use of this stoichiometric excess in no way adds to the cost of the process.

The digestion of the fluorspar, sulfuric acid and boric acid in solution is effected for a period of time sufficient to convert all of the fluoride in solution to $HBF_4$, usually from 2 to 8 hours at 80° C. to 100° C. At the conclusion of this period, the calcium sulfate is filtered from the solution of fluoboric acid, the filtercake is washed with a little hot water and the filtrate and washings are combined for fluoboric acid recovery.

In the process of my invention, the filtrate from the first step (containing at least 5 moles of boric acid, and preferably from 120% to 150% as much (i.e. 6 to 7.5 moles of boric acid) and 4 moles of sulfuric acid) is mixed with sufficient finely ground fluorspar to give the reactive equivalent of 10 moles of $CaF_2$ and sufficient additional sulfuric acid to give the reactive equivalent of the six additional moles of $H_2SO_4$ required by theory (see the above equation) and sufficient sulfuric acid to neutralize the $CaCO_3$ present in the fluorspar. This reaction may be effected over a wide range of reagent concentration, at subatmospheric, atmospheric and superatmospheric pressures, at temperatures between room temperature and 130° C. I prefer to effect this digestion of the fluorspar at temperatures between 80° C. and 100° C. for periods of time ranging from two to eight hours. At the conclusion of this period, the $CaSO_4$ is filtered off, washed with a little hot water, and the filtrate and washings (containing 5 moles of $HBF_4$ and (optionally) 1.0 to 2.5 moles of free boric acid) are recycled to the first step of this process. The $CaSO_4$ precipitate will retain all of the silica originally present in the fluorspar.

The following example is given to define and to illustrate this invention, but in no way to limit it to reagents, proportions or conditions described therein. Obvious modifications will occur to any person skilled in the art.

*Example*

To 4 liters of a solution containing 440 gms. of fluoboric acid (5 moles) and 124 gms. of boric acid (2 moles), add 736 gms. of double salt ($Na_2SO_4 \cdot NaF$) (4 moles) and sufficient washed filter cake from the Bayer process to contain 312 gms. of $Al(OH)_3$ (4 moles), (e.g. 381 gms. of filtercake containing 82% $Al(OH)_3$, prior to calcination). The reaction mixture is heated, with agitation, at 90° C. to 100° C. for one to two hours, the precipitated cryolite is filtered off, the filtercake is washed with a little hot water, the filtrate and washings are combined and the washed $Na_3AlF_6$ is dried by the processes well known in the art.

The filtrate and washings (about 4.5 liters) containing 392 gms. $H_2SO_4$ (4 moles) and 433 gms. of boric acid (7 moles) is now mixed with 971 gms. of a finely ground fluorspar (analyzing 84.5% $CaF_2$, 2.8% $CaCO_3$ and 12.7% $SiO_2$); and 718 gms. of 66° Bé. sulfuric acid (667 gms. $H_2SO_4$ or 6.81 moles). The fluorspar added contains the equivalent of 821 gms. $CaF_2$ (10.5 moles) and 27 gms. $CaCO_3$ (0.3 mole). The total amount of sulfuric acid in the solution (10.81 moles) is sufficient to react with all of the $CaCO_3$ and $CaF_2$ present. The reaction mixture is digested at 90° C. to 95° C., with agitation, for three hours. At the conclusion of this period (during which some concentration of the reaction mixture has occurred by evaporation of water) the $CaSO_4$ and $SiO_2$ is filtered off, the filtercake is washed with a little hot water, and the filtrate and washings are combined. There is thus obtained about four liters of a solution containing 440 gms. of fluoboric acid (5 moles) and 124 gms. of boric acid (2 moles). This solution is recycled to the first step of the process.

On recycling of mother liquors, the materials balance of this process may be given as follows:

736 parts of double salt ($Na_2SO_4 \cdot NaF$)
312 parts of aluminum hydroxide (or 204 parts of alumina)
971 parts of fluorspar (analyzing 84.5% $CaF_2$, 2.8% $CaCO_3$ and 12.7% $SiO_2$) (or equivalent of 821 parts of $CaF_2$)
718 parts of 66° Bé. sulfuric acid Yield 810 to 820 parts of cryolite ($Na_3AlF_6$)

and a residue of calcium sulfate and silica which is discarded.

The cryolite made by this process analyzes 99.92% $Na_3AlF_6$, with less than 0.04% $SiO_2$ and less than 0.02% $Fe_2O_3$. It must be emphasized that this process, unlike any process of the prior art, does not require caustic soda or soda ash as a primary raw material. All of the sodium in the cryolite is supplied as the double salt ($Na_2SO_4 \cdot NaF$). Similarly one-sixth of the fluorine in the final cryolite is supplied by the double salt. Finally 40% of the sulfuric acid used in the process for the preparation of the fluoboric acid is derived by the utilization of the sulfate ion in the double salt. Thus, we derive a complete utilization of a product which is obtained in appreciable amounts as a by-product in bauxite processing and which has never been used industrially before.

On the basis of a yield of 1.0 ton of alumina from 2.2 tons of bauxite (combined process) and an alumina: aluminum factor of 1.91, and a recovery of 13.5 lbs. of double salt per ton of bauxite processed, the double salt recovered from Arkansas bauxite will be equivalent to 56.7 lbs. per ton of aluminum produced. This amount of double salt will yield about 62.4 lbs. of cryolite. Since cryolite consumption in the electrolytic aluminum process varies from 47.0 to 60.0 lbs. per ton of aluminum produced, this process provides an ideal materials balance. By the recovery of the double salt in Arkansas bauxite ore and conversion to cryolite by the process of this invention sufficient cryolite can be obtained to provide all of the "make-up" in the electrolytic cells converting the alumina obtained from said bauxite ore to aluminum.

While the preferred raw material for the process of this invention is the double salt of composition $Na_2SO_4 \cdot NaF$ obtained during the concentration of the spent liquors from the recovery of alumina from the sodium aluminate leach liquors of the soda-lime sintering of Bayer process "red mud," it is obvious and understood that a mixture of equimolar amounts of sodium fluoride and sodium sulfate (e.g. salt cake, Glauber's salts), or a synthetically prepared co-precipitate of $Na_2SO_4 \cdot NaF$ double salt, may be used as a raw material in the process of this invention.

Having described my invention, what I claim and desire to protect by Letters Patent is:

1. A process for the manufacture of cryolite which comprises the steps of:

(*a*) reacting an aqueous solution containing fluoboric acid with a double salt of composition $Na_2SO_4 \cdot NaF$ and a member of the group consisting of aluminum hydroxide and aluminum oxide;

(*b*) separating the precipitate of cryolite from the solution of boric acid and sulfuric acid;

(c) reacting said solution of boric acid and sulfuric acid with a calcium fluoride-containing material and additional sulfuric acid in quantity sufficient to form an amount of fluoboric acid equivalent to the quantity employed in step (a) and a precipitate of calcium sulfate; and (d) separating the calcium sulfate from the solution of fluoboric acid and returning said solution of fluoboric acid to step (a) of the process.

2. A process for the manufacture of cryolite which comprises the steps of:

(a) reacting an aqueous solution containing five moles of fluoboric acid with four moles of a double salt of composition $Na_2SO_4 \cdot NaF$ and four mole-equivalents of a member of the group consisting of aluminum hydroxide and aluminum oxide;

(b) separating the precipitate of cryolite from the solution of boric acid and sulfuric acid;

(c) reacting said solution of boric acid and sulfuric acid with a calcium fluoride-containing material containing minor amounts of calcium carbonate in quantity sufficient to provide ten moles of reactive calcium fluoride and additional sulfuric acid in quantity sufficient to provide six moles of sulfuric acid in excess of the amount required to react with the calcium carbonate in the calcium fluoride-containing material, to form a solution of five moles of fluoboric acid and a precipitate of calcium sulfate; and (d) separating the calcium sulfate from the solution of five moles of fluoboric acid and returning said solution of fluoboric acid to step (a) of the process.

3. A process for the manufacture of cryolite which comprises the steps of:

(a) reacting an aqueous solution containing fluoboric acid with a double salt of composition $Na_2SO_4 \cdot NaF$ and a member of the group consisting of aluminum hydroxide and aluminum oxide, said double salt being derived from the spent sodium aluminate leach liquors of the soda-lime sintering of the "red mud" desilication residue of the Bayer alumina process;

(b) separating the precipitate of cryolite from the solution of boric acid and sulfuric acid;

(c) reacting said solution of boric acid and sulfuric acid with a calcium fluoride-containing material and additional sulfuric acid in quantity sufficient to form an amount of fluoboric acid equivalent to the quantity employed in step (a) and a precipitate of calcium sulfate;

(d) separating the calcium sulfate from the solution of fluoboric acid and returning said solution of fluoboric acid to step (a) of the process.

4. A process for the manufacture of cryolite which comprises the steps of:

(a) reacting an aqueous solution containing fluoboric acid with a double salt of composition $Na_2SO_4 \cdot NaF$ and a member of the group consisting of aluminum hydroxide and aluminum oxide, said fluoboric acid solution containing free boric acid.

(b) separating the precipitate of cryolite from the solution of boric acid and sulfuric acid;

(c) reacting said solution of boric acid and sulfuric acid with a calcium fluoride-containing material and additional sulfuric acid in quantity sufficient to form an amount of fluoboric acid equivalent to the quantity employed in step (a) and a precipitate of calcium sulfate; and (d) separating the calcium sulfate from the solution of fluoboric acid and returning said solution of fluoboric acid to step (a) of the process.

5. A process for the manufacture of cryolite which comprises the steps of:

(a) reacting an aqueous solution containing fluoboric acid with a double salt of composition $Na_2SO_4 \cdot NaF$ and a member of the group consisting of aluminum hydroxide and aluminum oxide in an aqueous medium at a temperature between 90° C. and 100° C.

(b) separating the precipitate of cryolite from the solution of boric acid and sulfuric acid;

(c) reacting said solution of boric acid and sulfuric acid with a calcium fluoride-containing material and additional sulfuric acid in quantity sufficient to form an amount of fluoboric acid equivalent to the quantity employed in step (a) and a precipitate of calcium sulfate; and (d) separating the calcium sulfate from the solution of fluoboric acid and returning said solution of fluoboric acid to step (a) of the process.

6. A process for the manufacture of cryolite which comprises the steps of:

(a) reacting an aqueous solution containing fluoboric acid with a double salt of composition $Na_2SO_4 \cdot NaF$ and a member of the group consisting of aluminum hydroxide and aluminum oxide;

(b) separating the precipitate of cryolite from the solution of boric acid and sulfuric acid;

(c) reacting said solution of boric acid and sulfuric acid with fluorspar and additional sulfuric acid in quantity sufficient to form an amount of fluoboric acid equivalent to the quantity employed in step (a) and a precipitate of calcium sulfate; and (d) separating the calcium sulfate from the solution of fluoboric acid and returning said solution of fluoboric acid to step (a) of the process.

7. A process for the manufacture of cryolite which comprises the steps of:

(a) reacting an aqueous solution containing fluoboric acid with a double salt of composition $Na_2SO_4 \cdot NaF$ and a member of the group consisting of aluminum hydroxide and aluminum oxide;

(b) separating the precipitate of cryolite from the solution of boric acid and sulfuric acid;

(c) reacting said solution of boric acid and sulfuric acid with fluorspar high in silica content and additional sulfuric acid in quantity sufficient to form an amount of fluoboric acid equivalent to the quantity employed in step (a) and a precipitate of calcium sulfate; and (d) separating the calcium sulfate from the solution of fluoboric acid and returning said solution of fluoboric acid to step (a) of the process.

8. A process for the manufacture of cryolite which comprises the steps of:

(a) reacting an aqueous solution containing five moles of fluoboric acid with four moles of a double salt of composition $Na_2SO_4 \cdot NaF$ and four mole-equivalents of a member of the group consisting of aluminum hydroxide and aluminum oxide;

(b) separating the precipitate of cryolite from the solution of boric acid and sulfuric acid;

(c) reacting said solution of boric acid and sulfuric acid with a calcium fluoride-containing material containing minor amounts of calcium carbonate in quantity sufficient to provide 10.0 moles of reactive $CaF_2$, said solution of boric acid and sulfuric acid being in the form of an aqueous medium containing from 5.0 to 7.5 moles of boric acid and sufficient sulfuric acid to provide 10.0 moles of $H_2SO_4$ in excess of that quantity required to react with the $CaCO_3$ in the calcium fluoride-containing material, to form a solution of five moles of fluoboric acid and a precipitate of calcium sulfate;

(d) separating the calcium sulfate from the solution of five moles of fluoboric acid and returning said solution of fluoboric acid to step (a) of the process.

9. A process for the manufacture of cryolite which comprises the steps of:

(a) reacting an aqueous solution containing fluoboric acid with a double salt of composition $Na_2SO_4 \cdot NaF$ and a member of the group consisting of aluminum hydroxide and aluminum oxide;

(b) separating the precipitate of cryolite from the solution of boric acid and sulfuric acid;

(c) reacting said solution of boric acid and sulfuric acid with a calcium fluoride-containing material and additional sulfuric acid in quantity sufficient to form an amount of fluoboric acid equivalent to the quantity employed in step (a) and a precipitate of calcium sulfate, said reaction being effected at a temperature between 80° C. and 100° C. for two to eight hours;

(d) separating the calcium sulfate from the solution of fluoboric acid and returning said solution of fluoboric acid to step (a) of the process.

10. A process for the manufacture of cryolite which comprises the steps of:

(a) reacting an aqueous solution containing fluoboric acid with an equimolecular mixture of sodium sulfate and sodium fluoride and a member of the group consisting of aluminum hydroxide and aluminum oxide;

(b) separating the precipitate of cryolite from the solution of boric acid and sulfuric acid;

(c) reacting said solution of boric acid and sulfuric acid with a calcium fluoride-containing material and additional sulfuric acid in quantity sufficient to form an amount of fluoboric acid equivalent to the quantity employed in step (a) and a precipitate of calcium sulfate; and (d) separating the calcium sulfate from the solution of fluoboric acid and returning said solution of fluoboric acid to step (a) of the process.

References Cited in the file of this patent

UNITED STATES PATENTS

| | | |
|---|---|---|
| 1,511,560 | Howard | Oct. 14, 1924 |
| 2,182,510 | Heiser | Dec. 5, 1939 |